(12) United States Patent
Nooka et al.

(10) Patent No.: US 10,505,952 B2
(45) Date of Patent: Dec. 10, 2019

(54) ATTACK DETECTION DEVICE, ATTACK DETECTION METHOD, AND ATTACK DETECTION PROGRAM

(71) Applicant: NIPPON TELEGRAPH AND TELEPHONE CORPORATION, Chiyoda-ku (JP)

(72) Inventors: Hiroyuki Nooka, Musashino (JP); Yuji Yamada, Chiyoda-ku (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 158 days.

(21) Appl. No.: 15/320,171

(22) PCT Filed: Jul. 2, 2015

(86) PCT No.: PCT/JP2015/069215
§ 371 (c)(1),
(2) Date: Dec. 19, 2016

(87) PCT Pub. No.: WO2016/002915
PCT Pub. Date: Jan. 7, 2016

(65) Prior Publication Data
US 2017/0126714 A1 May 4, 2017

(30) Foreign Application Priority Data
Jul. 4, 2014 (JP) ................................. 2014-138659

(51) Int. Cl.
*H04L 29/06* (2006.01)
(52) U.S. Cl.
CPC ...... *H04L 63/1416* (2013.01); *H04L 63/1425* (2013.01); *H04L 69/16* (2013.01)

(58) Field of Classification Search
None
See application file for complete search history.

(56) References Cited

U.S. PATENT DOCUMENTS 6,779,033 B1 * 8/2004 Watson ................... H04L 29/06
709/227
7,152,242 B2 * 12/2006 Douglas ................ G06F 21/552
726/23

(Continued)

FOREIGN PATENT DOCUMENTS

| CN | 101640594 A | 2/2010 |
| JP | 2007-166154 A | 6/2007 |

(Continued)

OTHER PUBLICATIONS

Ribeiro et al.; Online Traffic Classificaiton Based on Sub-Flows; 2011; Retrieved from the Internet <URL: https://ieeexplore.ieee.org/document/5990541/>; pp. 1-7, as printed. (Year: 2011).*

(Continued)

*Primary Examiner* — Saleh Najjar
*Assistant Examiner* — Michael W Chao
(74) *Attorney, Agent, or Firm* — Oblon, McClelland, Maier & Neustadt, L.L.P.

(57) ABSTRACT

An attack detection device including a packet collection unit that collects packets to be transmitted from a user terminal to a service providing server, a header-information acquisition unit that acquires header information from the packets, and an attack detection unit that determines whether each session is an attacking session by using the header information, wherein the attack detection unit compares a window size of a collected arbitrary packet and window sizes of other packets to one another for each of sessions, and when a comparison result satisfies a predetermined first condition, a corresponding session is detected as an attacking session.

6 Claims, 9 Drawing Sheets

(56) References Cited

U.S. PATENT DOCUMENTS

| | | | |
|---|---|---|---|
| 7,480,940 B1* | 1/2009 | Agbabian | H04L 63/1425 726/22 |
| 9,195,805 B1* | 11/2015 | Brandwine | G06F 21/00 |
| 9,699,212 B2* | 7/2017 | Adams | H04L 63/1458 |
| 2002/0103916 A1* | 8/2002 | Chen | H04L 43/00 709/229 |
| 2004/0233846 A1 | 11/2004 | Khandani et al. | |
| 2006/0161816 A1* | 7/2006 | Gula | H04L 41/065 714/39 |
| 2007/0297410 A1* | 12/2007 | Yoon | H04L 63/0227 370/392 |
| 2008/0320585 A1* | 12/2008 | Ansari | H04L 63/1416 726/13 |
| 2011/0131654 A1* | 6/2011 | Taneja | H04L 63/1416 726/23 |
| 2013/0042322 A1 | 2/2013 | Yoon | |
| 2013/0055375 A1* | 2/2013 | Cline | H04L 63/14 726/13 |
| 2013/0159540 A1 | 6/2013 | Taneja et al. | |
| 2014/0304817 A1* | 10/2014 | Kim | H04L 63/1408 726/23 |

FOREIGN PATENT DOCUMENTS

| | | |
|---|---|---|
| JP | 2008-118242 A | 5/2008 |
| WO | WO 2011/06650 A2 | 6/2011 |
| WO | WO 2011/06650 A3 | 6/2011 |

OTHER PUBLICATIONS

Kurakami, Hiroshi, "Combating for DoS Attacks; The DoS/DDoS attack countermeasure (2)—The advanced DDoS attack and countermeasure, From the viewpoint of website", IPSJ Magazine, vol. 54, No. 5, Apr. 15, 2013, 29 pages (with English translation).

Fernando Gont, "Security Assessment of the Transmission Control Protocol (TCP) draft-ietf-tcpm-tcp-security-02.txt" Internet Engineering Task Force IETF, No. 2, XP015073616, 2011, pp. 1-114.

* cited by examiner

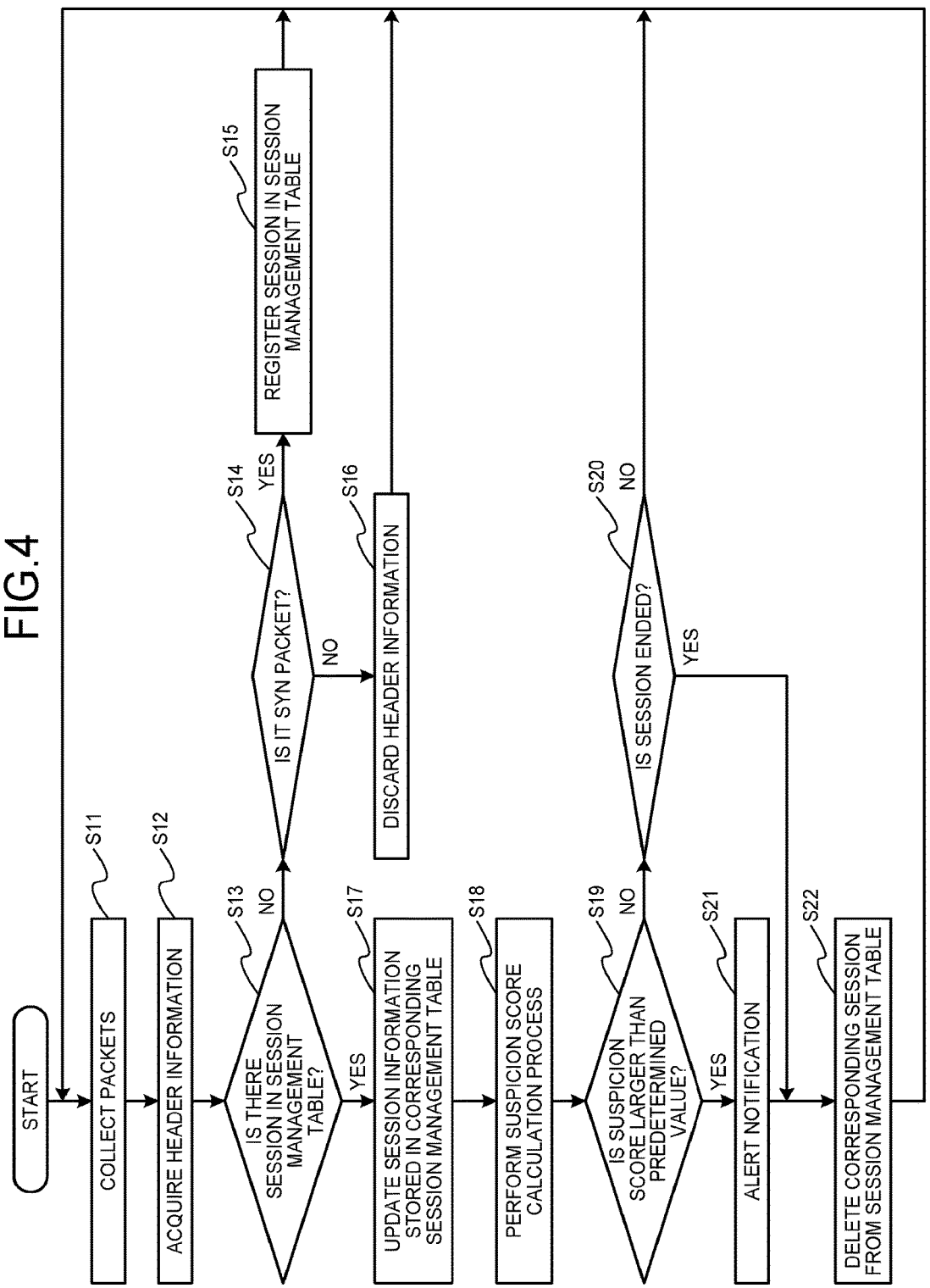

FIG.5

EXAMPLES OF INFORMATION IN SESSION MANAGEMENT TABLE

| | |
|---|---|
| SESSION SPECIFYING INFORMATION | TRANSMISSION-SOURCE IP ADDRESS |
| | TRANSMISSION-SOURCE PORT NUMBER |
| | RECEPTION IP ADDRESS |
| | RECEPTION PORT NUMBER |
| SESSION INFORMATION | TIME STAMP (SYN) |
| | TIME STAMP (FINAL PACKET) |
| | WINDOW SIZE VALUE OF ARBITRARY PACKET |
| | MAXIMUM VALUE OF WINDOW SIZE |
| | MINIMUM VALUE OF WINDOW SIZE |
| | AVERAGE VALUE OF WINDOW SIZE |
| | SQUARE SUM OF WINDOW SIZE |
| | TOTAL NUMBER OF REACHED PACKETS |
| | TOTAL NUMBER OF PACKET SIZES |
| | SUSPICION SCORE |
| | ALERT NOTIFICATION (PRESENT/NONE) |

FIG.6

EXAMPLES OF OUTPUT INFORMATION

| | |
|---|---|
| SESSION SPECIFY-ING INFORMATION | TRANSMISSION-SOURCE IP ADDRESS |
| | TRANSMISSION-SOURCE PORT NUMBER |
| | RECEPTION IP ADDRESS |
| | RECEPTION PORT NUMBER |
| SESSION INFORMATION | TIME STAMP (SYN) |
| | TIME STAMP (FINAL PACKET) |
| | WINDOW SIZE VALUE OF ARBITRARY PACKET |
| | MAXIMUM VALUE OF WINDOW SIZE |
| | MINIMUM VALUE OF WINDOW SIZE |
| | AVERAGE OF WINDOW SIZE |
| | STANDARD DEVIATION OF WINDOW SIZE |
| | TOTAL NUMBER OF REACHED PACKETS |
| | TOTAL NUMBER OF PACKET SIZES |
| | SUSPICION SCORE |
| | ALERT NOTIFICATION (NORMAL, ALERT NOTIFICATION) |

ATTACK DETECTION DEVICE, ATTACK DETECTION METHOD, AND ATTACK DETECTION PROGRAM

FIELD

The present invention relates to an attack detection device, an attack detection method, and an attack detection program for detecting an attack conducted by a client to a server, based on a packet transmitted and received between the client and the server.

BACKGROUND

In recent years, there has been a problem of increase of damages caused by DoS (Denial of Service) that causes public services on the Internet to be in a service suspended state with improper communication.

The DoS can be generally classified into two attacking forms. One of the attacking forms is an attacking form in which, as a malicious attacker transmits improper data or abnormal packets to a service provider, software of the service provider is caused to behave abnormally. The other one of the attacking forms is an attack of transmitting a large amount of traffic to a service provider to use up the bandwidth of communication lines of the service provider or the processing capabilities of a communication device.

As a technique of handling the first attacking form, there is a technique of finding abnormal behaviors of a server caused by improper communication by counting the number of packets flowing into the server for each type of these packets (see Patent Literature 1).

As a technique of handling the second attacking form, there is a technique of detecting a large amount of traffic based on, for example, a change of flow statistical information (see Patent Literature 2).

There is also a problem of a new type of attack referred to as "Slow READ DoS" in which, by reducing the size (a window size) of its own reception buffer to be notified to a communication counterpart to be a considerably small size, the information amount that the communication counterpart can transmit at a time is limited and the time required for communication is elongated to improperly occupy a session (see Non Patent Literature 1).

CITATION LIST

Patent Literatures

Patent Literature 1: Japanese Patent Application Laid-open No. 2007-166154
Patent Literature 2: Japanese Patent Application Laid-open No. 2008-118242

Non Patent Literature

Non Patent Literature 1: Hiroshi Kurakami, "The DoS/DDoS attack countermeasure (2)—The advanced DDoS attack and countermeasure, From the viewpoint of website—", Information Processing, Vol. 54, No. 5, pp. 475-480, Information Processing Society of Japan, 2013

SUMMARY

Technical Problem

According to the technique of Patent Literature 1, while it is possible to detect an attack accompanied with abnormal end of communication where an attacker abort the communication in the middle, there is a problem that it is not possible to detect an attack that is conducted while pursuing normal communication. For example, because the Slow READ DoS is established as an attack by not ending communication, such attack cannot be detected by conventional techniques such as that of Patent Literature 1.

Furthermore, in the detection technique using flow statistical information such as that of Patent Literature 2, there is a problem that omission in acquisition of communication packets occurs in sampling for creating the flow statistical information, and thus communication packets from a malicious attacker cannot be acquired.

The present invention has been achieved in view of the above circumstances, and an object of the present invention is to provide an attack detection device, an attack detection method, and an attack detection program capable of detecting an attack that is conducted while pursuing normal communication.

Solution to Problem

An attack detection device includes: a collection unit that collects packets to be transmitted from a client to a server; a header-information acquisition unit that acquires header information from the packets; and an attack detection unit that determines whether each session is an attacking session by using the header information, wherein the attack detection unit compares a window size of a collected arbitrary packet and window sizes of other packets to one another for each of sessions, and when a comparison result satisfies a predetermined first condition, a corresponding session is detected as an attacking session.

The attack detection device, wherein the other packets may be packets to be transmitted subsequently to the arbitrary packet.

The attack detection device, wherein the attack detection unit may compare a plurality of pieces of statistical information of a window size to one another for each of sessions, and when a comparison result satisfies a predetermined second condition, a corresponding session may be detected as an attacking session.

The attack detection device, wherein the plurality of pieces of statistical information of the window size may be an average window size and a maximum window size.

The attack detection device, wherein when a session establishing time calculated by using the header information for each of sessions is larger than a predetermined first threshold, the attack detection unit may detect a corresponding session as an attacking session.

The attack detection device, wherein the attack detection unit may calculate a throughput by using the header information for each of the sessions, and when the throughput is smaller than a predetermined second threshold, the attack detection unit may detect a corresponding session as an attacking session.

The attack detection device, wherein, upon detection of the attacking session, the attack detection unit may transmit attack detection information including information for specifying the attacking session to a manager terminal.

The attack detection device, wherein, upon detection of the attacking session, the attack detection unit may transmit a reset packet to the server and the client to discontinue the attacking session.

An attack detection method executed by a computer, the computer is caused to execute: a collecting step of collecting packets to be transmitted from a client to a server; a header-information acquiring step of acquiring header information from the packets; and an attack detecting step of determining whether each session is an attacking session by using the header information, wherein at the attack detecting step, a window size of a collected arbitrary packet and window sizes of other packets are compared to one another for each of sessions, and when a comparison result satisfies a predetermined first condition, a corresponding session is detected as an attacking session.

An attack detection program executed by a computer, the computer is caused to perform as: a collection unit that collects packets to be transmitted from a client to a server; a header-information acquisition unit that acquires header information from the packets; and an attack detection unit that determines whether each session is an attacking session by using the header information, wherein the attack detection unit compares a window size of a collected arbitrary packet and window sizes of other packets to one another for each of sessions, and when a comparison result satisfies a predetermined first condition, a corresponding session is detected as an attacking session.

Advantageous Effects of Invention

According to the present invention, it is possible to provide an attack detection device, an attack detection method, and an attack detection program capable of detecting an attack that is conducted while pursuing normal communication.

BRIEF DESCRIPTION OF DRAWINGS

FIG. 4 is a flowchart illustrating an attack detecting process.

FIG. 5 is a diagram illustrating an example of a session management table.

FIG. 6 is a diagram illustrating an example of session output information.

DESCRIPTION OF EMBODIMENTS

Embodiments of the present invention are described below.

First Embodiment

Figure 1:
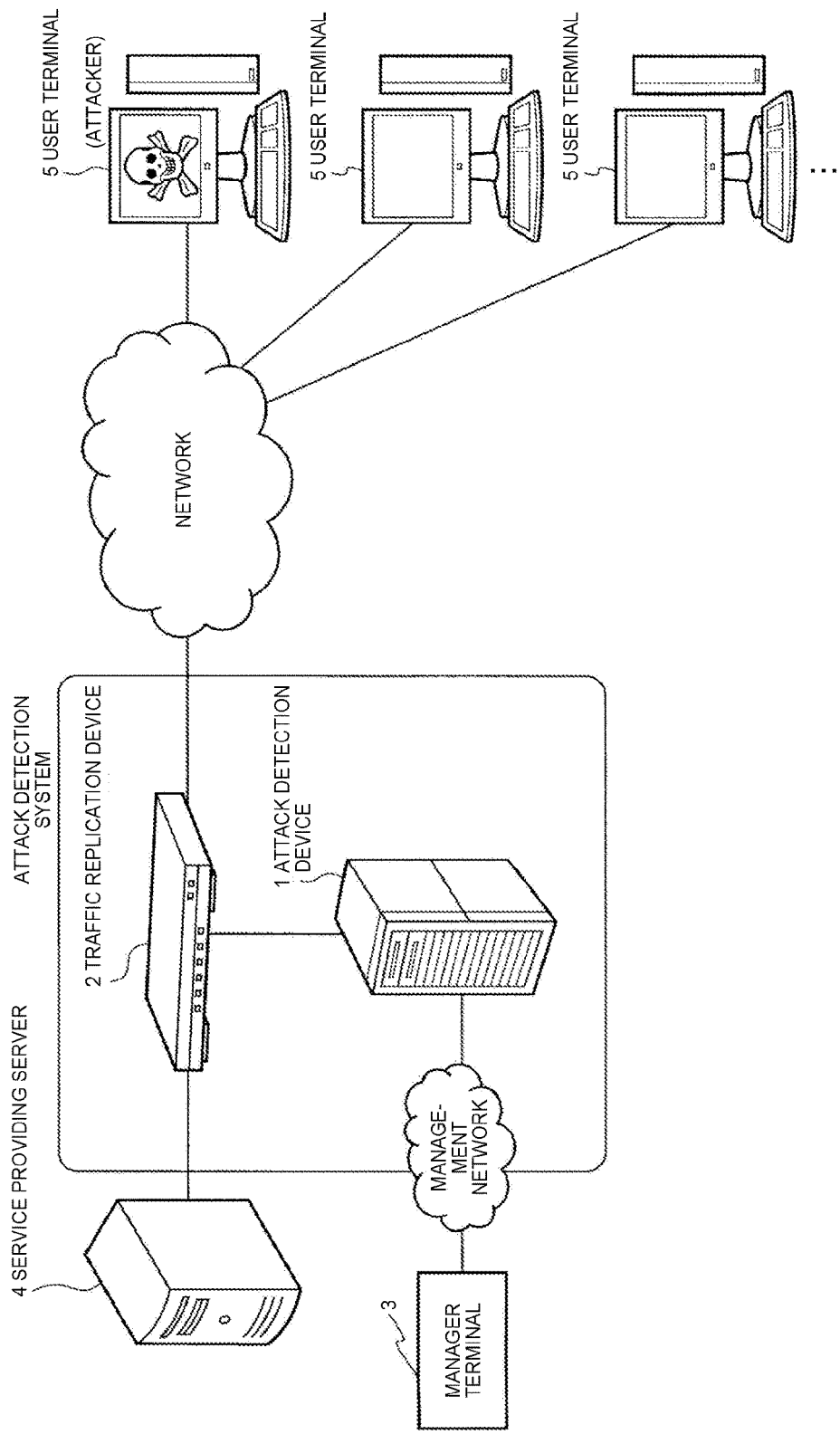
FIG. 1 is an overall configuration diagram of an attack detection system according to a first embodiment.

FIG. 1 is an overall configuration diagram illustrating an attack detection system according to an embodiment of the present invention. The attack detection system is provided between a service providing server 4 and a user terminal 5 (client) that is used by a service user, monitors communication between the service providing server 4 and the user terminal 5, and detects an attack conducted by an improper user. The service providing server 4 provides various services to the user terminal 5 via a network such as the Internet.

The attack detection system illustrated in FIG. 1 includes an attack detection device 1 and a traffic replication device 2. The traffic replication device 2 is provided between the service providing server 4 and the user terminal 5, transfers packets (traffic) to be transmitted from the user terminal 5 to the service providing server 4 to the service providing server 4, replicates a corresponding one of the packets, and outputs the replicated packet to the attack detection device 1.

The attack detection device 1 detects an attack conducted by an improper user by using the packets transmitted from the traffic replication device 2. Upon detection of the attack, the attack detection device 1 notifies attack detection information to a manager terminal 3 via a management network.

Figure 2:
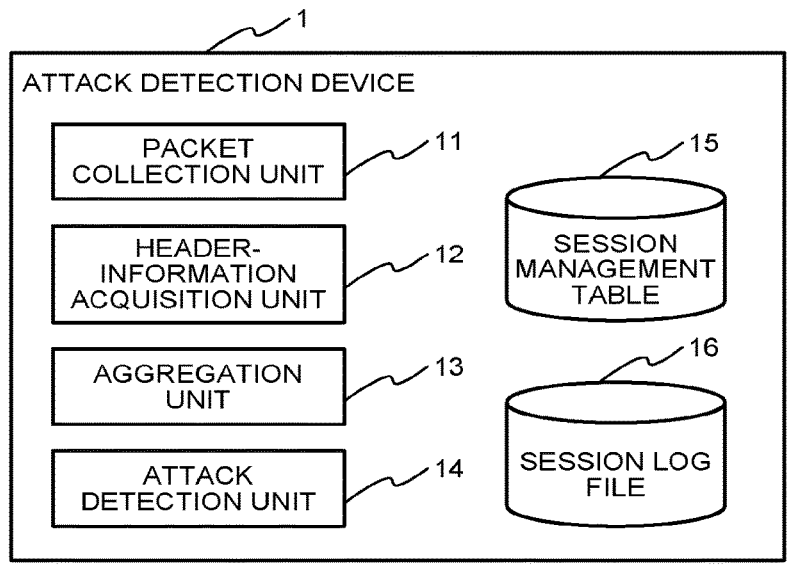
FIG. 2 is a functional block diagram illustrating a configuration of the attack detection device according to the first embodiment.

FIG. 2 is a functional block diagram illustrating a configuration of the attack detection device 1 according to the present embodiment. The attack detection device 1 illustrated in FIG. 2 includes a packet collection unit 11, a header-information acquisition unit 12, an aggregation unit 13, an attack detection unit 14, a session management table 15, and a session log file 16.

The packet collection unit 11 collects packets that are output from the traffic replication device 2 and transmitted from the user terminal 5 to the service providing server 4. The header-information acquisition unit 12 acquires header information from respective packets collected by the packet collection unit 11. The aggregation unit 13 uses the acquired header information to classify and aggregate respective packets in each session.

The attack detection unit 14 uses the header information aggregated in each of sessions to determine whether each of the sessions is an attacking session. The present embodiment compares, in each of the sessions, the window size of a collected arbitrary packet and the window sizes of other packets to one another, and when the comparison result satisfies a predetermined first condition, the corresponding session is detected as an attacking session. Further, the attack detection unit 14 compares, in each of the sessions, a plurality of pieces of statistical information of a window size to one another, and when the comparison result satisfies a predetermined second condition, the corresponding session is detected as an attacking session. Further, upon detection of an attacking session, the attack detection unit 14 transmits attack detection information including information specifying the corresponding attacking session to the manager terminal 3.

The session management table 15 stores therein session information (header aggregate information) in each of the sessions aggregated by the aggregation unit 13. Session information of the corresponding session is output as a log to the session log file 16 at the end of the session.

Figure 3:
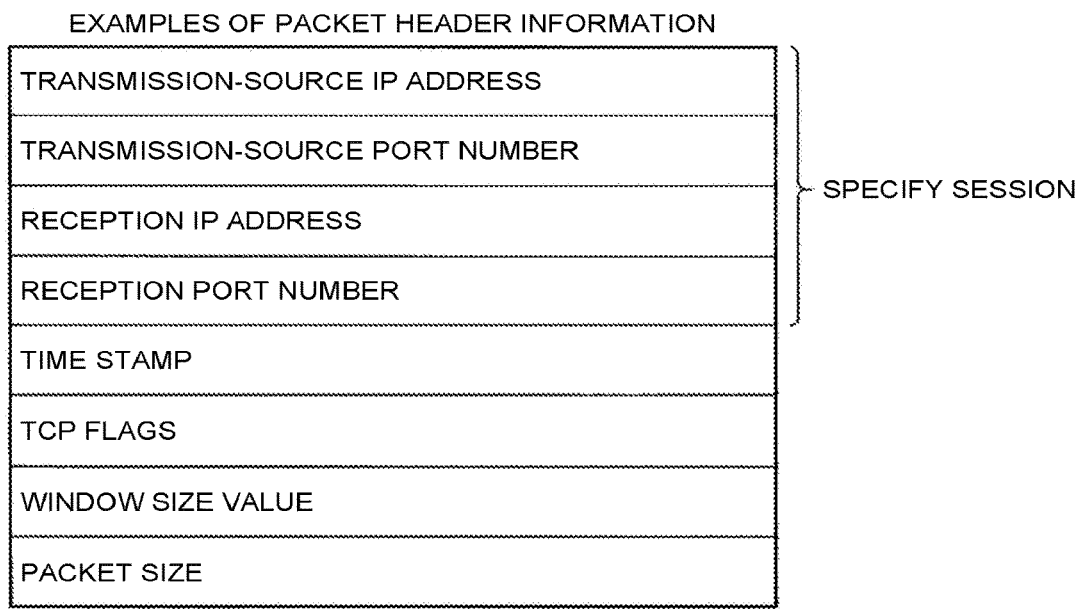
FIG. 3 is a diagram illustrating an example of packet header information.

FIG. 3 is a diagram illustrating an example of header information of a packet. It is assumed that communication between the service providing server 4 and the user terminal 5 according to the present embodiment is performed by using a TCP packet. Examples of the header information includes a transmission-source IP address, a transmission-source port number, a reception IP address, a reception port number, a time stamp, TCP flags, a window size, and a packet size.

The session can be specified (identified) by four elements, which are a transmission-source IP address, a transmission-source port number, a reception IP address, and a reception port number. The window size is a size of its own reception buffer to be notified to a communication counterpart. In this example, as the window size, there is set a size of a reception buffer of the user terminal 5 itself to be notified to the service providing server 4, which is the communication counterpart of the user terminal 5.

The attack detection device 1 described above can use a general-purpose computer system including, for example, a CPU, a memory, and an external storage device such as a hard disk. In this computer system, as the CPU executes a program for the attack detection device 1 loaded on the memory, respective functions of the attack detection device 1 are realized. Further, the program for the attack detection device 1 can be stored in a computer-readable recording medium such as a hard disk, a flexible disk, a CD-ROM, an MO, and a DVD-ROM, and can be distributed via a network.

Next, processes in the present embodiment are described.

FIG. 4 is a flowchart of an attack detecting process of the attack detection device 1 according to the present embodiment.

The packet collection unit 11 of the attack detection device 1 receives, from the traffic replication device 2, packets to be transmitted from the user terminal 5 to the service providing server 4, and collects these packets (S11). Subsequently, the header-information acquisition unit 12 acquires header information from the packets collected at S11, and specifies a session of a corresponding one of these packets by using a transmission-source IP address, a transmission-source port number, a reception IP address, and a reception port number included in the header information (S12).

The aggregation unit 13 determines whether there is a session of the corresponding packet in the session management table 15 (S13). When there is no session of the corresponding packet in the session management table 15 (NO at S13), and when a TCP flag of the header information is a SYN packet of "SYN" (a session opening request) (YES at S14), the aggregation unit 13 registers the session of each of the packets received at S11 in the session management table 15 (S15). The process then returns to S11 to perform a process for a packet to be received next.

FIG. 5 is a diagram illustrating an example of the session management table 15. In the session management table 15, session information (header aggregation information) for detecting an attacking session of an improper user is set for each of sessions. Session specifying information for specifying a session and the session information are associated with each other and stored in the session management table 15.

The session information illustrated in FIG. 5 includes elements such as a time stamp indicating a time when a SYN packet has reached, a time stamp indicating a time when a final packet has reached, a window size of an arbitrary packet, a maximum value of a window size, a minimum value of a window size, an average value of a window size, a square sum of a window size of a packet, a total number of reached packets, a total number of packet sizes, a suspicion score, and the presence of an alert notification. The window size of an arbitrary packet is, for example, a window size of a SYN packet, an ACK packet, and the like.

When a session is registered at S15, the aggregation unit 13 uses header information of the corresponding packet to register the session specifying information and a time stamp of a SYN packet, or, in a case of a SYN packet, the session specifying information and a record in which the window size of the SYN packet and the like, in the session management table 15.

When the TCP flag of the header information is not "SYN" (NO at S14), because the corresponding packet is not a SYN packet to be transmitted first at the time of opening a session although there is no corresponding session in the session management table 15, the aggregation unit 13 deems the packet as an abnormal packet, and discards the header information of the packet received at S11 (S16). The process then returns to S11 to perform a process for a packet to be received next.

Meanwhile, when a session of the packet received at S11 is already present in the session management table 15 (YES at S13), the aggregation unit 13 aggregates the header information of the corresponding session, and updates the session information in the session management table 15 (S17). That is, the aggregation unit 13 uses the header information of the packet received at S11 to calculate session information such as the maximum value, minimum value, average value, and square sum of a window size and updates the session information.

Subsequently, the attack detection unit 14 uses the session information after updating the corresponding session in the session management table 15 to calculate the suspicion score (S18).

In the present embodiment, it is assumed that the suspicion score is calculated by using the window size of the header information. The Slow READ DoS attack in which, by reducing the window size of its own device to be considerably small, the information amount that a communication counterpart can transmit at a time is limited and the time required for communication is elongated to improperly occupy a session, has a characteristic that the window size becomes small during communication. Because setting of the window size to be small is a normal operation of a TCP, it is difficult to determine whether the setting is caused by an attack or it is a normal operation. In this connection, in the present embodiment, by focusing on a change (behavior) of the window size, the Slow READ DoS attack is detected with higher accuracy.

In this example, it is assumed that at least one of the following two methods is used.

(1) The window size of an arbitrary packet set in the session management table 15 and the window size of a received packet are compared to each other. When the comparison result satisfies a predetermined condition, the corresponding session is determined to be an attacking session, and a predetermined value is set in the suspicion score. For example, when the arbitrary packet is a SYN packet, if the window size of the SYN packet is considerably larger than those of subsequent packets, that is, the window sizes of subsequent packets are considerably smaller as compared to the window size of the SYN packet (for example, when the following expression is satisfied), the corresponding session is determined to be an attacking session.

Window size of SYN packet−window size of subsequent packet>threshold (2) A plurality of pieces of statistical information of a window size are compared to one another, and when the comparison result satisfies a predetermined condition, the corresponding session is determined to be an attacking session, and a predetermined value is set in the suspicion score. The statistical information of the window size can be statistical information of a window size set in the session management table 15 or can be statistical information calculated by using the window size set in the session management table 15. Further, the comparison of the pieces of statistical information can be a comparison among the pieces of statistical information or can be a comparison between statistical information and a predetermined threshold.

For example, when the maximum value of the window size set in the session management table 15 and an average value of the window size are compared to each other, and if the comparison result satisfies a predetermined condition, the corresponding session is determined to be an attacking session, and a predetermined value is set in the suspicion score. Specifically, when the ratio of the average value of the window size with respect to the maximum value of the window size is smaller than a predetermine threshold (for example, when the following expression is satisfied), the corresponding session is determined to be an attacking session.

Average value of the window size/maximum value of the window size<threshold (for example, 0.3)

In the case of (2), because the average value of the window size is used, the above condition is hardly satisfied immediately after starting a session, and, after the start of the session, a time for collecting a certain number of packets is required. Meanwhile, in the case of (1), the window size of a first SYN packet and the window sizes of packets subsequently received are sequentially compared to each other, and thus it is possible to determine whether the corresponding session is an attacking session even immediately after the start of the session.

In a case where only the method (1) is used for the calculation of the suspicion score, when the condition of the method (1) is satisfied, the attack detection unit 14 sets a predetermined first score value in the suspicion score in the session management table 15. In a case where only the method (2) is used for the calculation of the suspicion score, when the condition of the method (2) is satisfied, the attack detection unit 14 sets a predetermined second score value in the suspicion score in the session management table 15. In a case where the methods (1) and (2) are used for calculating the suspicion score, when the conditions of the methods (1) and (2) are satisfied, the attack detection unit 14 sets a score value obtained by aggregating the first score value and the second score value is set in the suspicion score in the session management table 15. The score value of the first score value and that of the second score value can be the same or different.

Subsequently, the attack detection unit 14 determines whether the suspicion score calculated at S18 exceeds a predetermined threshold for detection (S19), and when the suspicion score exceeds the threshold for detection (YES at S19), the corresponding session is determined to be an attacking session. As for the threshold for detection, depending on whether it is the case where only the method (1) is used for calculating the suspicion score, the case where only the method (2) is used therefor, or the case where the methods (1) and (2) are used therefor, an appropriate value for the respective cases is set.

When the corresponding session is determined to be an attacking session (YES at S19), the attack detection unit 14 transmits detection information (an alert) to the manager terminal 3 via a management network, and updates an alert notification in the session management table 15 to be "present" (S21).

Subsequently, the aggregation unit 13 outputs (records) a record of a session having been determined as an attacking session from the session management table 15 to the session log file 16 as log information, and deletes the record of the corresponding session from the session management table 15 (S22). The process then returns to S11 to perform a process for a packet to be received next. Thereafter, when a packet of a session having been determined as an attacking session is received at S11, because the corresponding session is not present in the session management table (NO at S13) and the packet is not a SYN packet (NO at S14), the header information of the corresponding packet is discarded (S16).

FIG. 6 is a diagram illustrating an example of session log information output to the session log file 16.

When a suspicion score does not exceed a threshold for detection (NO at S19) and the packet received at S11 is a packet (a FIN packet or an RST packet) indicating end of a session or reset thereof (YES at S20), the aggregation unit 13 assumes that the corresponding session ends, and outputs the record of the corresponding session to the session log file 16 as log information, and deletes the record of the corresponding session from the session management table 15 (S22). The process then returns to S11 to perform a process of a packet to be received next. The FIN packet is a packet in which the TCP flag is "FIN" and that indicates end of the session, and the RST packet is a packet in which the TCP flag is "RST" and that indicates reset (close) of the session.

At S18 in FIG. 4 described above, the suspicion score is calculated by using a window size; however, the suspicion score can be also calculated by using other pieces of information in the session management table 15.

For example, the attack detection unit 14 calculates a session establishing time, which is a difference between a time stamp of a final packet (a packet received at S11) in the session management table 15 and a time stamp of a SYN packet, and when the calculated session establishing time is larger than a predetermined threshold (for example, 30 seconds), it is possible that the session is determined to be an attacking session and a predetermined score value is added to the suspicion score.

Furthermore, the attack detection unit 14 calculates a throughput by using the session establishing time described above and a total value of packet sizes set in the session management table 15, and when the calculated throughput is smaller than a predetermined threshold (for example, 300 bps), it is possible that the corresponding session is determined to be an attacking session and a predetermined score value is added to the suspicion score.

Next, a protecting process against attacks after the attack detection device 1 has detected an attacking session (FIG. 4, YES at S19) is described.

Figure 7:
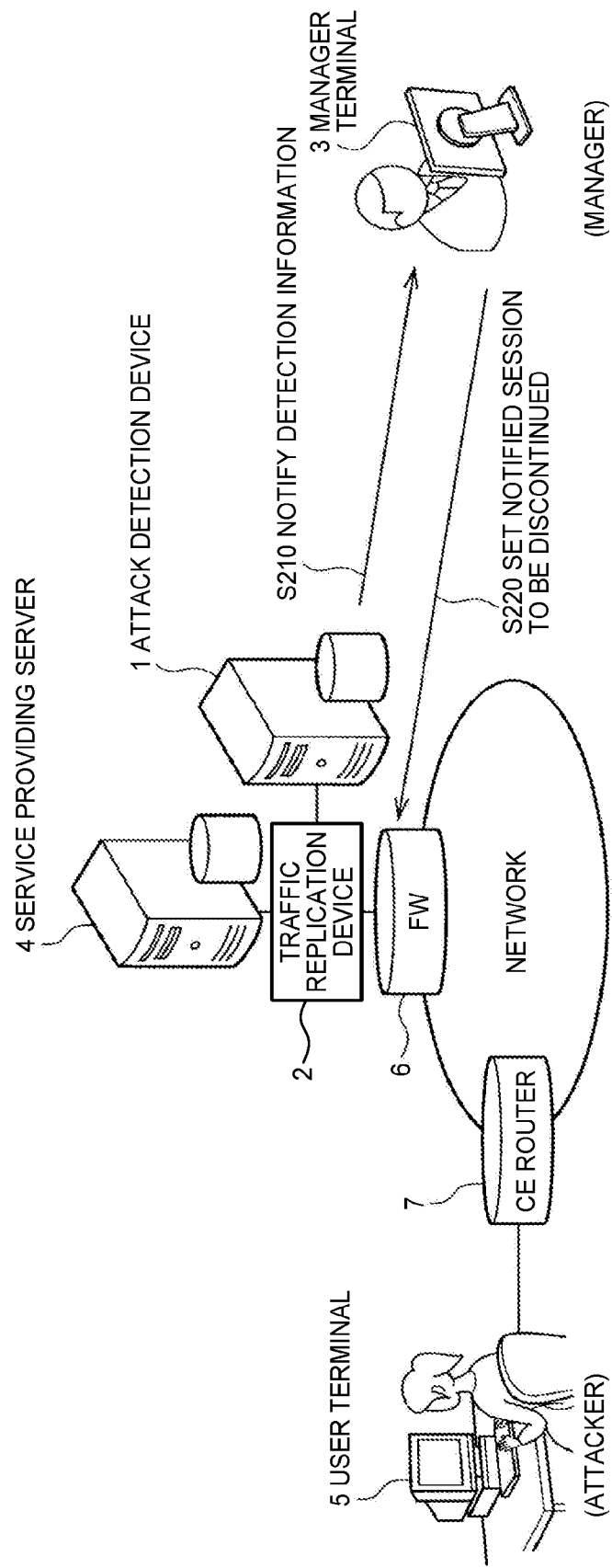
FIG. 7 is an explanatory diagram for explaining a protecting process against attacks after detecting an attack.

FIG. 7 is an explanatory diagram for explaining a protecting process against attacks. The attack detection unit 14 of the attack detection device 1 transmits detection information indicating detection of an attack to the manager terminal 3 by using an e-mail, an SNMP TRAP and the like (S210). The detection information includes session specifying information (a transmission-source IP address, a transmission-source port number, a reception IP address, and a reception port number) of a session having been determined as an attacking session.

The manager terminal 3 receives detection information and presents the received detection information to a manager such as a network operator. The manager inputs a setting instruction for setting a firewall (FW) 6 to block an attacking session set in the detection information to the manager terminal 3. The manager terminal 3 sets the firewall 6 according to the input setting instruction (S220). Due to this configuration, the firewall 6 discards a packet transmitted from the user terminal 5 of an attacker detected by the attack detection device 1 to the service providing sever 4 via a CE router 7 (Customer Edge router), and disconnects communication of the attacking session.

In FIG. 7, it is assumed that the manager terminal 3 sets the firewall 6 upon reception of an instruction from a manager; however, it is also possible to configure that the attack detection unit 14 of the attack detection device 1 sets the firewall 6 to block the attacking session at a timing when detection information is transmitted to the manager terminal 3.

Second Embodiment

Figure 8:
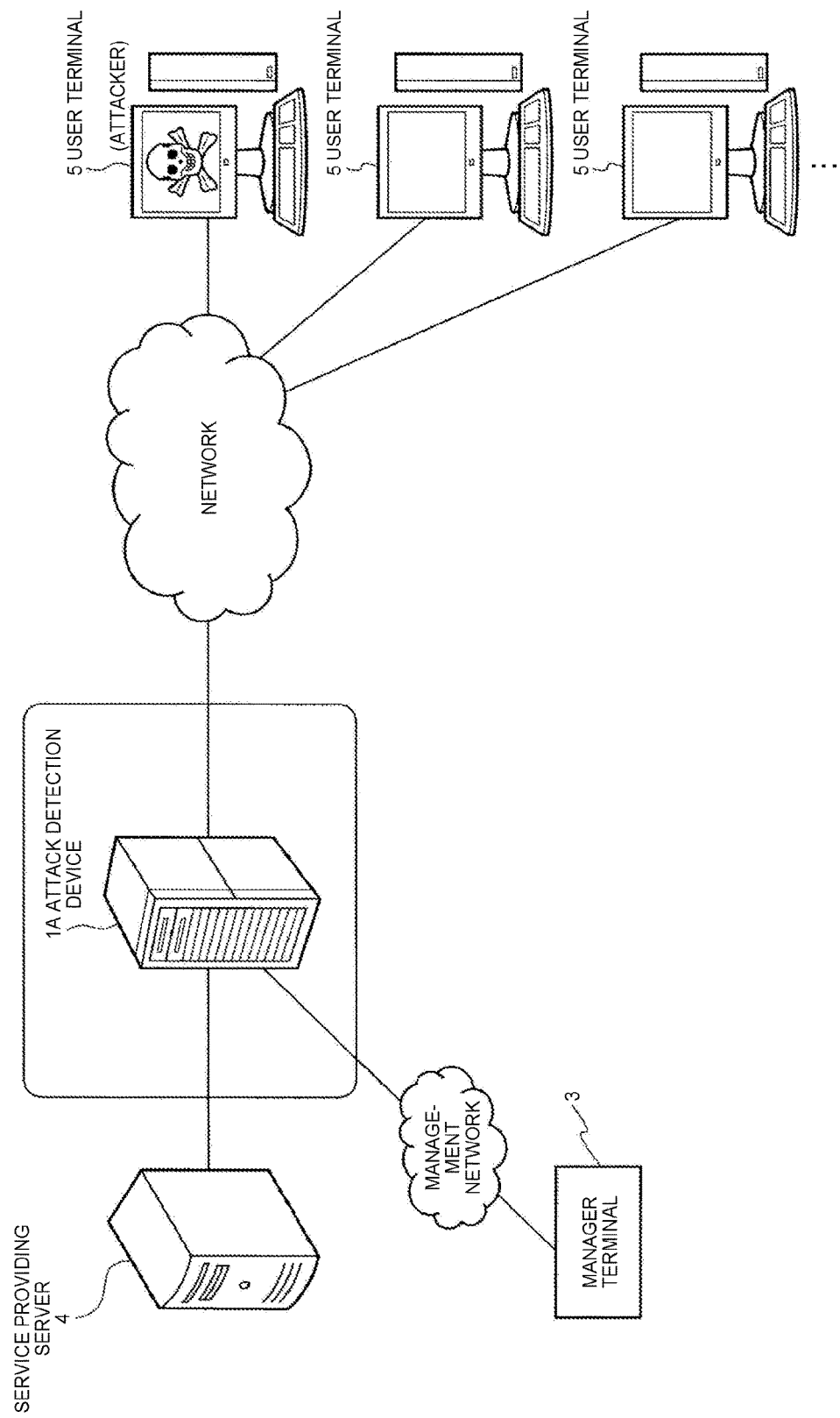
FIG. 8 is an overall configuration diagram illustrating an attack detection device according to a second embodiment.

FIG. 8 is an overall configuration diagram illustrating an attack detection device 1A according to a second embodiment of the present invention. In the second embodiment, the traffic replication device 2 is not included in the attack detection device 1A, and the attack detection device 1A is provided between the service providing server 4 and the user terminal 5.

Figure 9:
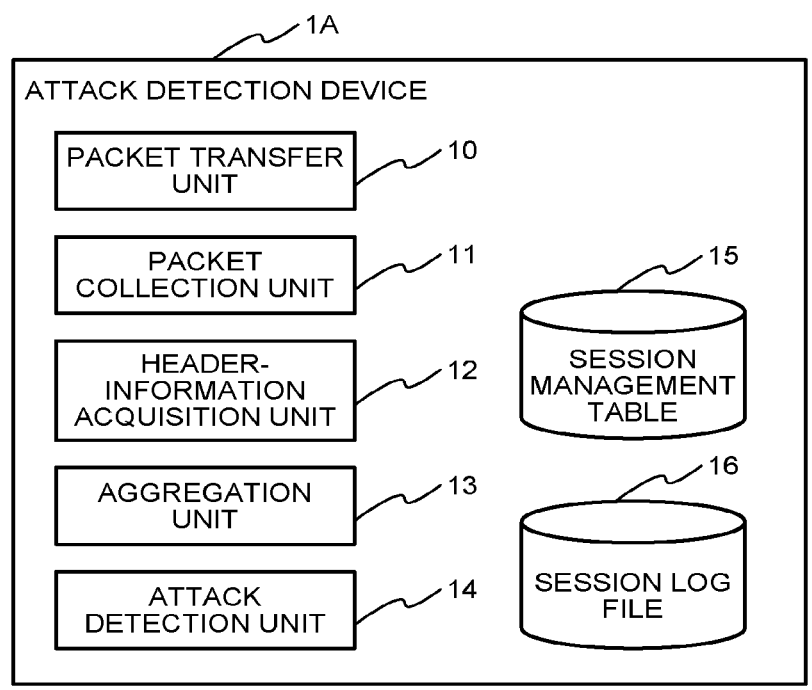
FIG. 9 is a functional block diagram illustrating a configuration of the attack detection device according to the second embodiment.

FIG. 9 is a functional block diagram illustrating a configuration of the attack detection device 1A according to the second embodiment. The attack detection device 1A illustrated in FIG. 9 includes a packet transfer unit 10, the packet collection unit 11, the header-information acquisition unit 12, the aggregation unit 13, the attack detection unit 14, the session management table 15, and the session log file 16. The attack detection device 1A is different from the attack detection device 1 according to the first embodiment in a feature of including the packet transfer unit 10. The packet transfer unit 10 transfers a packet transmitted from the user terminal 5 to the service providing server 4 to the service providing server 4, and then replicates the packet and sends the packet to the packet collection unit 11.

In the attack detection device 1A, the packet collection unit 11, the header-information acquisition unit 12, the aggregation unit 13, the attack detection unit 14, the session management table 15, and the session log file 16 are identical to those included in the attack detection device 1 according to the first embodiment, and thus descriptions thereof will be omitted. Further, because the attack detecting process of the attack detection device 1A is also identical to the attack detecting process according to the first embodiment (FIG. 4), descriptions thereof will be omitted here.

Figure 10:
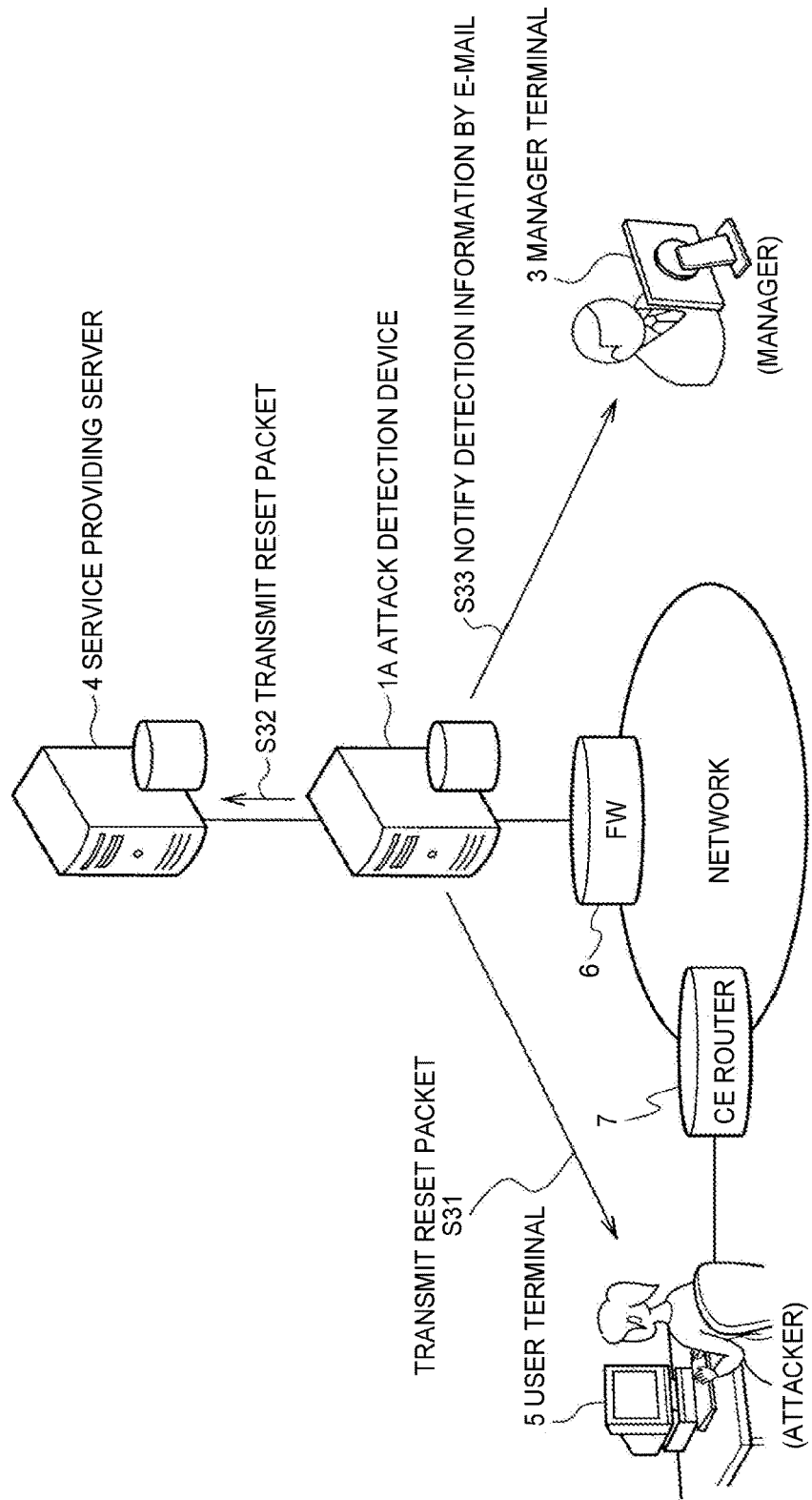
FIG. 10 is an explanatory diagram for explaining a protecting process against attacks after detecting an attack.

FIG. 10 is an explanatory diagram for explaining a protecting process against attacks in the second embodiment. Upon detection of an attacking session, the attack detection unit 14 of the attack detection device 1A transmits an RST packet in which its TCP flag is "RST" to the user terminal 5 (an attacker) that is the transmission source of the attacking session (S31), transmits the RST packet to the service providing server 4 that is the reception destination of the attacking session (S32), and resets (closes) the attacking session. Further, the attack detection unit 14 transmits detection information indicating detection of an attack, to the manager terminal (S33).

By once resetting the attacking session by transmitting the RST packet, a global IP address is changed regularly. Therefore, even when a session having been determined as an attacking session in the past is reestablished, the session is not deemed as an attacking session as far as it is normal communication, and the session is not discontinued.

In the first and second embodiments described above, in order to cause the service providing server 4 to provide services, for each of sessions present between the service providing server 4 and the user terminal 5 of a service user, a session conducted by an improper user (an attacker) is detected based on the behavior of header information included in a packet transmitted from the user terminal 5 to the service providing server 4.

Due to this configuration, in the present embodiment, in public services used by many and unspecified people, these services are protected from an attack that is conducted by an improper user and hinders provision of these services to other users.

Furthermore, in the present embodiment, an attacking session is detected by using the window size of header information. Due to this configuration, in the present embodiment, it is possible to detect an attack that is conducted while pursuing normal communication, such as the Slow READ DoS attack in which, by reducing the window size of its own device to be considerably small, the information amount that a communication counterpart can transmit at a time is limited and the time required for communication is elongated to improperly occupy a session.

That is, reducing the window size of its own device to be notified to the communication counterpart is a normal behavior for congestion control of communication. Therefore, if it is merely providing a threshold in each parameter value, there is a probability that a packet functioning normally to realize original purposes is erroneously detected as an attack. Therefore, in the present embodiment, by focusing on a change (behavior) of the window size, an attack that is conducted while pursuing normal communication, such as the Slow READ DoS attack, can be detected with high accuracy.

The present invention is not limited to the embodiments described above, and various modifications can be made within the scope of the invention. For example, the firewall 6 is set as the protecting process against attacks (FIG. 7) in the first embodiment and an RST packet is transmitted as a method for protection against attacks in the second embodiment (FIG. 10); however, it is also possible to configure the present invention that an RST packet is transmitted in the first embodiment and a firewall is set in the second embodiment. Further, in the first and second embodiments, the two protection methods against attacks, which are setting of the firewall 6 and transmission of an RST packet, can be carried out at the same time.

REFERENCE SIGNS LIST 1, 1A: attack detection device
10: packet transfer unit
11: packet collection unit
12: header-information acquisition unit
13: aggregation unit
14: attack detection unit
15: session management table
16: session log file
2: traffic replication device
3: manager terminal
4: service providing server
5: user terminal
6: firewall
7: CE router

The invention claimed is:

1. An attack detection device comprising:
processing circuitry configured to
collect packets to be transmitted from a client to a server;
acquire header information from the packets; and determine whether each session is an attacking session by using the header information, wherein the processing circuitry, for a corresponding session, determines if a predetermined condition occurs based on at least one of
  (i) a window size of an arbitrary SYN packet is greater than the window size of a subsequent packet within the corresponding session by a threshold; and
  (ii) after collecting a plurality of packets for the corresponding session, a ratio of a window size average value to a window size maximum value within the corresponding session is smaller than a predetermined threshold, when the predetermined condition is determined to occur, the corresponding session is detected as an attacking session, and wherein upon detection of the attacking session, the processing circuitry transmits attack detection information including information for specifying the attacking session to a manager terminal or transmits a reset packet to the server and the client to discontinue the attacking session.

2. The attack detection device according to claim 1, wherein when a session establishing duration calculated by using the header information for each of sessions is larger than a predetermined threshold, the processing circuitry detects a corresponding session as an attacking session.

3. The attack detection device according to claim 1, wherein the processing circuitry calculates a throughput by using the header information for each of the sessions, and when the throughput is smaller than a predetermined threshold, the processing circuitry detects a corresponding session as an attacking session.

4. The attack detection device according to claim 1, wherein the processing circuitry determines if a predetermined condition occurs based on at least both of (i) and (ii).

5. An attack detection method executed by an attack detection device, comprising:

collecting packets to be transmitted from a client to a server;

acquiring header information from the packets;

determining whether each session is an attacking session by using the header information, wherein for a corresponding session, determining if a predetermined condition occurs based on at least one of
  (i) a window size of an arbitrary SYN packet is greater than the window size of a subsequent packet within the corresponding session by a threshold; and
  (ii) after collecting a plurality of packets for the corresponding session, a ratio of a window size average value to a window size maximum value within the corresponding session is smaller than a predetermined threshold, when the predetermined condition is determined to occur, the corresponding session is detected as an attacking session, and wherein upon detection of the attacking session, the method includes transmitting attack detection information including information for specifying the attacking session to a manager terminal or transmits a reset packet to the server and the client to discontinue the attacking session.

6. A non-transitory computer-readable recording medium having stored an attack detection program that causes a computer to perform a method comprising:

collecting packets to be transmitted from a client to a server;

acquiring header information from the packets;

determining whether each session is an attacking session by using the header information, wherein for a corresponding session, determining if a predetermined condition occurs based on at least one of
  (i) a window size of an arbitrary SYN packet is greater than the window size of a subsequent packet within the corresponding session by a threshold; and
  (ii) after collecting a plurality of packets for the corresponding session, a ratio of a window size average value to a window size maximum value within the corresponding session is smaller than a predetermined threshold, when the predetermined condition is determined to occur, the corresponding session is detected as an attacking session, and wherein upon detection of the attacking session, the method includes transmitting attack detection information including information for specifying the attacking session to a manager terminal or transmits a reset packet to the server and the client to discontinue the attacking session.

\* \* \* \* \*